United States Patent
Teibel et al.

(10) Patent No.: US 9,946,557 B2
(45) Date of Patent: Apr. 17, 2018

(54) COMPUTING DEVICE WITH SCRIPT EXECUTION APPLICATION

(75) Inventors: Joseph Harold Teibel, Albany, OR (US); Thomas J Gilg, Shedd, OR (US); Jon Brewster, Monmouth, OR (US); James Alleiy Rowson, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 38 days.

(21) Appl. No.: 14/397,585

(22) PCT Filed: Jul. 31, 2012

(86) PCT No.: PCT/US2012/049077
§ 371 (c)(1),
(2), (4) Date: Oct. 28, 2014

(87) PCT Pub. No.: WO2014/021877
PCT Pub. Date: Feb. 6, 2014

(65) Prior Publication Data
US 2015/0128154 A1    May 7, 2015

(51) Int. Cl.
| G06F 3/00 | (2006.01) |
| G06F 9/44 | (2018.01) |
| G06F 9/46 | (2006.01) |
| G06F 13/00 | (2006.01) |
| G06F 9/445 | (2018.01) |
| G06F 9/455 | (2018.01) |

(52) U.S. Cl.
CPC ...... G06F 9/44521 (2013.01); G06F 9/44526 (2013.01); G06F 9/45529 (2013.01)

(58) Field of Classification Search
None
See application file for complete search history.

(56) References Cited

U.S. PATENT DOCUMENTS

| 7,596,610 | B2 | 9/2009 | Faisal et al. |
| 2002/0143792 | A1 | 10/2002 | Belu |
| 2003/0037021 | A1 | 2/2003 | Krothappalli et al. |
| 2004/0111727 | A1 | 6/2004 | Schwarzbauer et al. |
| 2004/0139443 | A1* | 7/2004 | Hatle .......... H04L 29/06 719/310 |
| 2005/0034065 | A1 | 2/2005 | Weight |
| 2006/0200753 | A1* | 9/2006 | Bhatia .......... G06F 17/30893 715/203 |
| 2007/0058812 | A1* | 3/2007 | Ali .......... G06F 1/14 380/274 |
| 2007/0078950 | A1 | 4/2007 | Hopkins et al. |
| 2008/0033997 | A1 | 2/2008 | Banker |

(Continued)

OTHER PUBLICATIONS

Print Script API Reference, Feb. 25, 2015, PaperCut.com.*

(Continued)

*Primary Examiner* — Craig Dorais
(74) *Attorney, Agent, or Firm* — HP Inc. Patent Department (57) ABSTRACT

A computing device includes at least one processor to execute a web browser application and a separate and distinct script execution application. The web browser application submits a script execution request to the script execution application, and the script execution application executes a first script task based on the script execution request.

17 Claims, 7 Drawing Sheets

(56) References Cited

U.S. PATENT DOCUMENTS

| | | |
|---|---|---|
| 2008/0098093 A1 | 4/2008 | Simon et al. |
| 2008/0301672 A1 | 12/2008 | Rao et al. |
| 2009/0083104 A1 | 3/2009 | Barrett |
| 2010/0138558 A1* | 6/2010 | Chen .................. G06F 17/3089 709/242 |
| 2011/0015917 A1 | 1/2011 | Wang et al. |
| 2011/0041140 A1 | 2/2011 | Harm et al. |
| 2011/0066676 A1 | 3/2011 | Kleyzit et al. |
| 2011/0185038 A1 | 7/2011 | Yoon et al. |
| 2011/0289499 A1 | 11/2011 | Haubold et al. |
| 2012/0072926 A1 | 3/2012 | Woo et al. |

OTHER PUBLICATIONS

How Can I List All the Printers on a Remote Computer, Aug. 14, 2006, blogs.technet.com.*

Hillenbrand, M., et al., "A Software Deployment Service for Autonomous Computing Environments," 2004, 8 pages, retrieved from http://webcache.googleusercontentcom/search?q=cache:http://dspace.icsy.de:12000/dspace/bitstream/123456789/134/2/DPArchiv.0095.pdf.

International Search Report & Written Opinion received in PCT Application No. PCT/US2012/049077, dated Mar. 26, 2013, 8 pages.

International Search Report & Written Opinion received in PCT Application No. PCT/US2012/049078, dated Mar. 26, 2013, 8 pages.

Mateev, M., "Deploying Visual Studio LightSwitch Beta 1 2-Tier Desktop Applications," Oct. 9, 2010, 9 pages, retrieved from http://blogs.infragistics.com/blogs/mihail_mateev/archive/2010/10/09/deploying-visual-studio-lightswitch-beta-1-2-tier-desktop-applications.aspx.

TENMAX.COM, "Teleport Pro Program Features," (Web Page), Jul. 17. 2014, available at: http://www.tenmax.com/teleport/pro/features.htm.

* cited by examiner

COMPUTING DEVICE WITH SCRIPT EXECUTION APPLICATION

CROSS-REFERENCE TO RELATED APPLICATIONS

This Utility Patent Application is related to U.S. patent application Ser. No. PCT/US12/49078, entitled "COMPUTING DEVICE WITH AUTOMATIC DOWNLOAD AND INSTALLATION OF A NEW PLUG-IN," filed Jul. 31, 2012, and which is incorporated herein by reference.

BACKGROUND

By design, web page based applications running in a web browser (e.g. Internet Explorer, Firefox), coded using html and JavaScript, only execute JavaScript within the page the user has loaded and only within the content of the browser, which itself exposes a Browser Object Model (BOM) that also gives the JavaScript limited access to some resources on the computing device. That is, the browser interprets and executes the JavaScript in the web page.

Also, traditional electronic application deployment usually takes the form of downloading an install package from a web site, the browser getting involved to ask the user if they really want to download, the download occurring, an installer package being invoked and after several more questions and clicks the user ends up with an application installed.

DETAILED DESCRIPTION

In the following detailed description, reference is made to the accompanying drawings which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples of the present disclosure can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Most of the calls that JavaScript typically makes inside of a browser are to the BOM, and it is the BOM that reaches out to operating system (OS) resources and the Internet. However, browser BOMs are typically very limited in what they can reach out and do. One implementation is directed to a method that allows a web application to execute policies and business logic through JavaScript running in an application with local system account privileges. Another implementation is directed to a method for a web-application to execute JavaScript within a local system account context.

Many users are deterred from installing applications via the web due to the numerous steps involved: security exceptions invoked by the browser, security exceptions invoked by the operating system, and the breadth of the installation steps for the installer itself. Another implementation is directed to a platform for deploying applications and application extensions with minimal user interaction.

Figure 1:
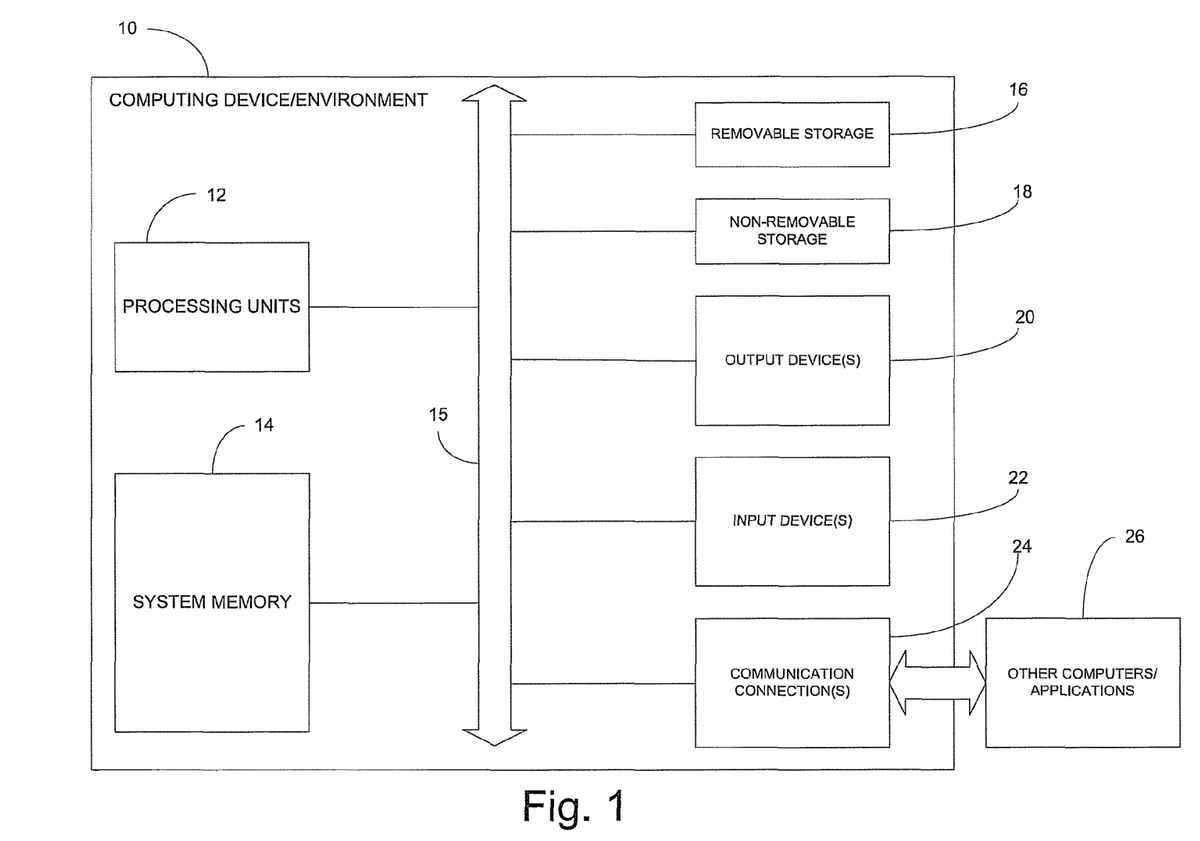
FIG. 1 is a block diagram illustrating a computing environment suitable for implementing aspects of a system for script execution and plug-in deployment according to one example.

FIG. 1 is a diagram illustrating a computing environment 10 suitable for implementing aspects of a system for script execution and plug-in deployment according to one example. In the illustrated embodiment, the computing system or computing device 10 includes one or more processing units 12 and system memory 14. Depending on the exact configuration and type of computing device, memory 14 may be volatile (such as RAM), non-volatile (such as ROM, flash memory, etc.), or some combination of the two.

Computing device 10 may also have additional features/functionality. For example, computing device 10 may also include additional storage (removable and/or non-removable) including, but not limited to, magnetic or optical disks or tape. Such additional storage is illustrated in FIG. 1 by removable storage 16 and non-removable storage 18. Computer storage media includes volatile and nonvolatile, removable and non-removable media implemented in any suitable method or technology for storage of information such as computer readable instructions, data structures, program modules or other data. Memory 14, removable storage 16 and non-removable storage 18 are all examples of computer storage media (e.g., computer-readable storage media storing computer-executable instructions that when executed by at least one processor cause the at least one processor to perform a method). Computer storage media includes RAM, ROM, EEPROM, flash memory or other memory technology, CD-ROM, digital versatile disks (DVD) or other optical storage, magnetic cassettes, magnetic tape, and magnetic disk storage or other magnetic storage devices. Any such computer storage media may be part of computing device 10.

The various elements of computing device 10 are communicatively coupled together via one or more communication links 15. Computing device 10 also includes one or more communication connections 24 that allow computing device 10 to communicate with other computers/applications 26. Computing device 10 may also include input device(s) 22, such as keyboard, pointing device (e.g., mouse), pen, voice input device, touch input device, scanner, etc. Computing device 10 may also include output device(s) 20, such as a display, speakers, printer, etc.

FIG. 1 and the above discussion are intended to provide a brief general description of a suitable computing environment in which one or more embodiments may be implemented. It should be understood, however, that handheld, portable, and other computing devices of all kinds are contemplated for use. FIG. 1 thus illustrates an example of a suitable computing system environment 10 in which the embodiments may be implemented, although as made clear above, the computing system environment 10 is only one example of a suitable computing environment and is not intended to suggest any limitation as to the scope of use or functionality of the embodiments. Neither should the computing environment 10 be interpreted as having any dependency or requirement relating to any one or combination of components illustrated in the exemplary operating environment 10.

Figure 2:
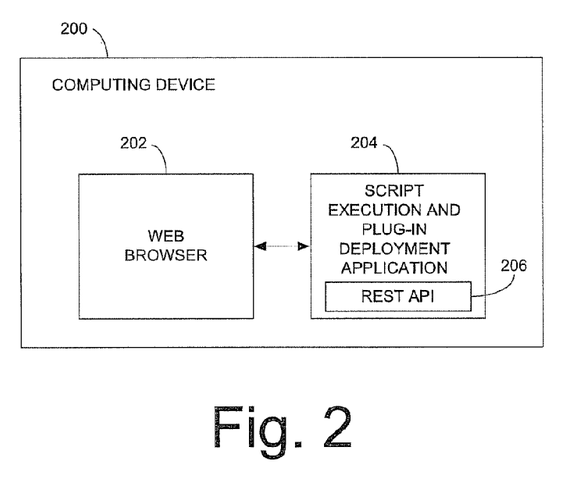
FIG. 2 is a block diagram illustrating a computing device configured to perform script execution and plug-in deployment according to one example.

FIG. 2 is a block diagram illustrating a computing device 200 configured to perform script execution and plug-in deployment according to one example. Computing device 200 includes a web browser application 202 and a script execution and plug-in deployment application 204.

Web pages containing JavaScript are typically limited to using the functionality and resources exposed by the browser to provide user-functionality. However, application 204 according to one implementation provides an alternate JavaScript execution environment with additional execution capability, which is exposed to web applications through its REpresentational State Transfer (REST) Application Programming Interface (API) 206, and which removes these restrictions on what a web application can do using JavaScript in the browser's execution environment, and allows an expanded set of functionality and exposure to local system resources (e.g., operating system resources, such as printers and scanners, and local file system resources) using a local service provided by application 204. Application 204 according to one implementation is also configured to distribute application level functionality on behalf of web solutions. These features are described in further detail below.

Figure 3:
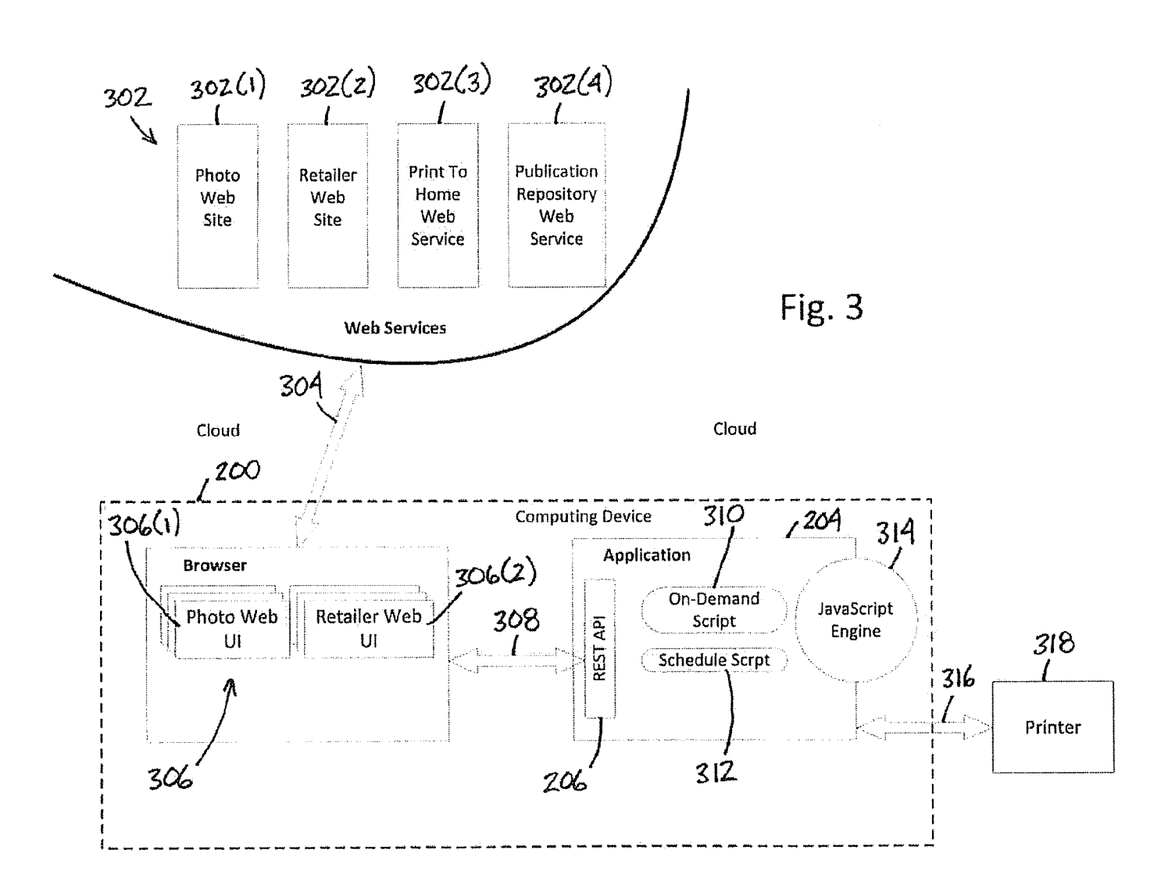
FIG. 3 is a block diagram illustrating the computing device shown in FIG. 2 interacting with web services according to one example.

FIG. 3 is a block diagram illustrating the computing device 200 shown in FIG. 2 interacting with web services according to one example. FIG. 3 shows web services 302, which include a Photo Web Site 302(1), a Retailer Web Site 302(2), a Print To Home Web Service 302(3), and a Publication Repository Web Service 302(4). Web browser 202 interacts with web services 302 as represented by communication link 304. Web browser 202 includes various user interface (UI) elements 306 associated with the web services 302, including Photo Web UI elements 306(1), and Retailer Web UI elements 306(2).

Through the REST API 206 (running on localhost), exposed by the application 204 installed on the user's computing device 200, a web page in web browser 202 can hand off JavaScript execution to the application 204. For example, the web page in the web browser 202 can hand a reference (URL) to some alternate JavaScript to the application 204, and the application 204 will retrieve the alternate JavaScript and cause it to be executed in the JavaScript engine 314. The communication between web browser 202 and application 204 for this functionality is represented by communication link 308. This feature allows a lot more functionality and resources to be exposed to the JavaScript (than would be allowed within the browser 202) and allows the application 204 to expose new functionality and resources as needed by web solutions developed to use the application 204. In one implementation, web pages running in web browser 202 communicate with application 204 using Asynchronous JavaScript and XML (AJAX) communications (i.e., by making AJAX calls to the REST API 206).

Application 204 includes an On-Demand Script function 310 for the immediate execution of JavaScript tasks. On-Demand Script function 310 invokes a JavaScript engine 314, such as an open source Rhino embedded JavaScript interpreter, for the execution of the JavaScript task. In addition to running JavaScript within the application 204 while the user is interacting with a web page via browser 202, a web application within browser 202 can also submit a scheduled JavaScript task for execution on a specific date and time to application 204. Application 204 includes a Schedule Script function 312 for scheduling JavaScript tasks. Through the REST API 206, the web application provides task data (e.g. when to run, what Uniform Resource Locator (URL) to call to pull down the Javascript, simple recurrence rules, and custom data to be used at execution time) and application 204 manages the scheduled tasks, calling the URL provided at the scheduled date and time.

When the date and time of a scheduled task is reached, application 204 will pull JavaScript down from a web server and execute it. The JavaScript can be parameterized via URL parameters (e.g., URL provided by the web application when scheduling the task) or through a data structure passed to application 204 when scheduling the task (i.e., "custom data"). The application 204 passes the scheduled task data to the web server at execution time. The web server can respond by manipulating the JavaScript server-side based on specific parameters given to application 204 when the task was scheduled (e.g., name of the printer to print a document to, selected by the user within a web page when the task was originally scheduled), and then pass the parameterized JavaScript to application 204 for execution.

By using this method for scheduling JavaScript tasks, web applications can perform tasks and provide functionality to users even when the browser 202 has been closed and there is no web page open. This type of functionality does not exist for web applications today.

In one implementation, application 204 is implemented as a Windows 32/64 service that supports on-demand and scheduled JavaScript tasks. Application 204 according to one implementation also supports discovery of printers, such as printer 318, and submitting PDF documents to a printer, as represented by communication link 316 between application 204 and printer 318. Application 204 also supports creating and deleting desktop icons.

Computing device 200 allows users, via web browser 202, to subscribe to a publication, and to schedule recurring delivery of it to their printer 318. In one embodiment, web applications from web services 302 present a subscription and then schedule JavaScript tasks accordingly. As long as the user's computing device 200 is on and application 204 is running, whether anyone is logged in or not, application 204 will then execute scheduled JavaScript that will pull down the PDFs and invoke the print REST API. In one embodiment, application 204 runs as soon as computing device 200 is turned on, and the operating system is running. A user can request that the browser 202 display a list of available printers to accomplish the task, and the browser 202 communicates with application 204 to obtain and display a list of available printers. Application 204 also provides plug-in installation functionality by providing an API for a web solution to install a plug-in on the user's machine. This functionality is described in further detail below.

Figure 4:
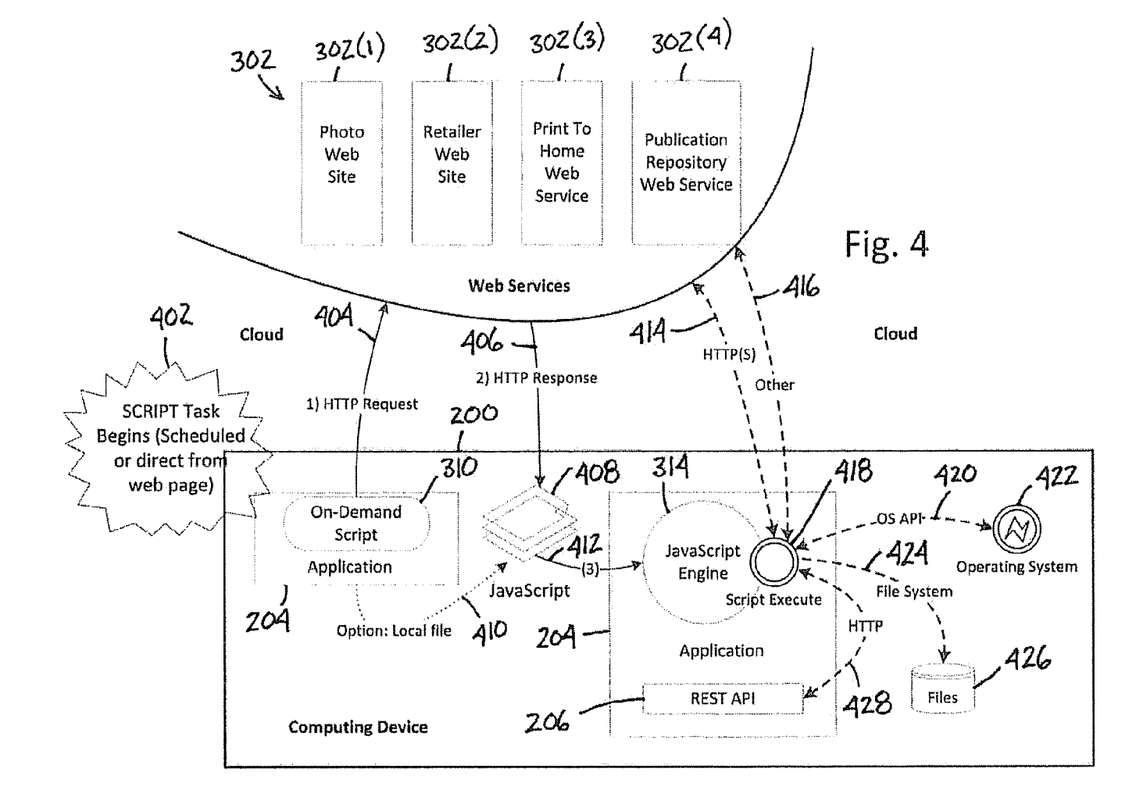
FIG. 4 is a block diagram illustrating the computing device shown in FIG. 2 interacting with web services and executing JavaScript according to one example.

FIG. 4 is a block diagram illustrating the computing device 200 shown in FIG. 2 interacting with web services and executing JavaScript according to one example. Element 402 indicates that a script task begins (scheduled or direct from web page). As described above, application 204 provides immediate on-demand execution of JavaScript, as well as scheduled execution of JavaScript. In one implementation, as part of the JavaScript execution process, the On-Demand Script function 310 of the application 204 sends a Hypertext Transfer Protocol (HTTP) request to the appropriate web service 302, as indicated by arrow 404, In response, the web service 302 sends an HTTP response, including a JavaScript task 408 to be executed, as indicated by arrow 406. Alternatively, the JavaScript task 408 can be obtained from a local file on the computing device 200, as indicated by arrow 410. The JavaScript task 408 is then provided to the JavaScript Engine 314 of the application 204 for execution, as indicated by arrow 412.

The execution of the JavaScript task 408 is represented by node 418, and potentially involves one or more communications between the executing JavaScript 408 and other elements. These communications are represented by arrows 414, 416, 420, 424, and 428. As part of the JavaScript execution, JavaScript 408 may have HTTP(S) communications (arrow 414) or other communications (arrow 416) with one or more of the web services 302: As part of the JavaScript execution, JavaScript 408 may communicate with local system resources of computing device 200. For example, JavaScript 408 may communicate with operating system (OS) 422, as indicated by OS API arrow 420, and JavaScript 408 may communicate with local files 426, as indicated by File System arrow 424. JavaScript 408 may also perform HTTP communications via REST API 206 as part of the JavaScript execution, as indicated by arrow 428. In one embodiment, the REST APIs themselves are supported by application 204, and application 204 itself can interface with various OS resources like the file system and input and output devices.

Figure 5:
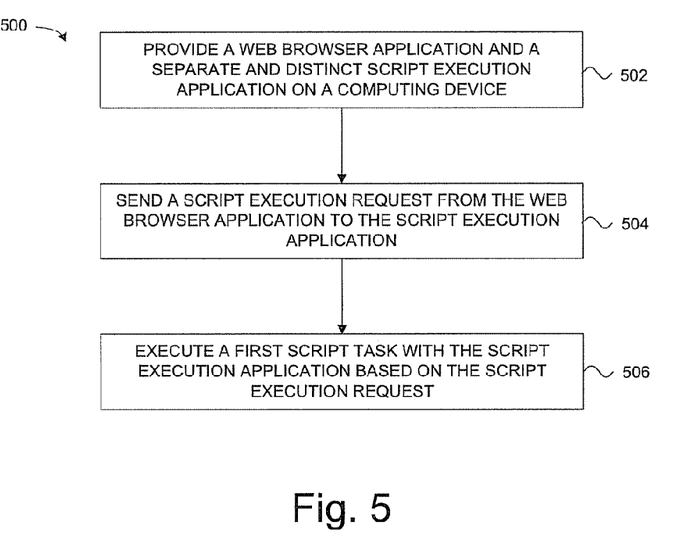
FIG. 5 is a flow diagram illustrating a computer-implemented method of executing a script task according to one example.

FIG. 5 is a flow diagram illustrating a computer-implemented method 500 of executing a script task according to one example. At 502, a web browser application and a separate and distinct script execution application are provided on a computing device. At 504, a script execution request is sent from the web browser application to the script execution application. At 506, a first script task is executed by the script execution application based on the script execution request. In one implementation of method 500, the script execution request indicates that the first script task is to be executed at a specified future date and time.

One embodiment is directed to a computing device that includes at least one processor configured to execute a web browser application and a separate and distinct script execution application. The web browser application is configured to submit a script execution request to the script execution application, and the script execution application is configured to execute a first script task based on the script execution request.

In one embodiment, the script execution request indicates that the first script task is to be executed immediately. In another embodiment, the script execution request indicates that the first script task is to be executed at a specified future time (e.g., indicates a future date and time for execution of the first script task). The script execution application according to one embodiment is configured to execute the first script task at the specified future time regardless of whether the web browser application is running at the specified future time.

In one embodiment, the script execution request identifies a Uniform Resource Locator (URL) to assist the script execution application to obtain the first script task for execution. The first script task according to one embodiment is configured to provide the web browser application with a list of available printers. The first script task according to another embodiment is configured to schedule recurring delivery of documents to a printer.

In one embodiment, the script execution application includes a REpresentational State Transfer (REST) Application Programming Interface (API) for receiving the script execution request from the web browser application. The web browser application according to one embodiment is configured to communicate with the REST API of the script execution application using Asynchronous JavaScript and XML (AJAX) communications.

In one embodiment, the first script task is a JavaScript task. The script execution application according to one embodiment is configured to obtain the first script task from a web service in response to an Hypertext Transfer Protocol (HTTP) request sent by the script execution application. In another embodiment, the script execution application is configured to obtain the first script task from a local file on the computing device.

In one embodiment, execution of the first script task by the script execution application includes communications between the first script task and a web service. In another embodiment, execution of the first script task by the script execution application includes communications between the first script task and an operating system of the computing device. In another embodiment, execution of the first script task by the script execution application includes communications between the first script task and a local file system n of the computing device. In another embodiment, execution of the first script task by the script execution application includes Hypertext Transfer Protocol (HTTP) communications by the first script task via a REpresentational State Transfer (REST) Application Programming Interface (API) of the script execution application.

Another embodiment is directed to a computing device that includes at least one processor configured to execute a web browser application and a separate and distinct script execution application. The web browser application is configured to submit script execution requests to the script execution application. The script execution requests include requests for immediate execution of scripts and requests for scheduled execution of scripts at future points in time. The script execution application is configured to execute JavaScript tasks based on the script execution requests.

In addition to providing on-demand and scheduled execution of JavaScript tasks, application 204 according to one embodiment is also configured to deploy plug-ins (e.g., applications) on computing device 200. The term "plug-in" as used herein is intended to encompass any computer executable code that extends the functionality of an application, such as application 204, or that can perform as a separate stand-alone application. Application 204 may be downloaded and installed by users in the traditional electronic distribution method. Once installed, application 204 provides plug-in deployment functionality to web sites through the localhost REST API 206. Application 204 according to one embodiment distributes application level functionality on behalf of web solutions that need that level of interaction with the user's system, with minimal interaction with the user.

Figure 6:
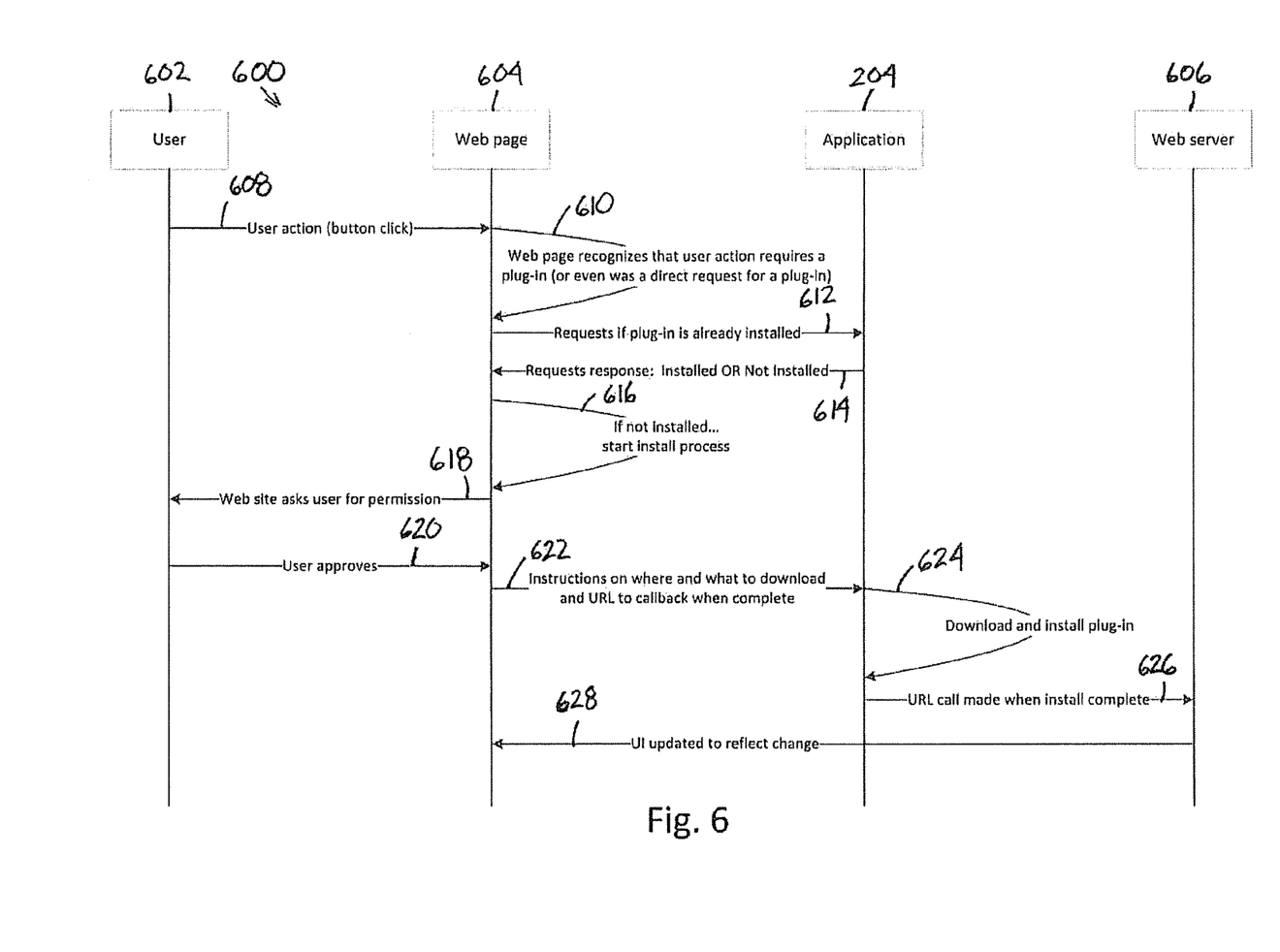
FIG. 6 is a diagram illustrating a computer-implemented method of installing a plug-in on a computing device according to one example.

FIG. 6 is a diagram illustrating a computer-implemented method 600 of installing a plug-in on a computing device 200 according to one example. FIG. 6 shows user 602, web page 604, application 204, and web server 606. The web page 604 is provided by web server 606 to web browser 202 (FIG. 3) on computing device 200, and the application 204 is installed on computing device 200. The user 602 interacts with the web page 604 using the web browser 202.

The method 600 begins at 608 with the user 602 performing a user action (e.g., a button click) on the web page 604. At 610, the web page 604 recognizes that the user action at 608 requires the installation of a new plug-in, or was a direct request for the installation of a new plug-in. At 612, the web page 604 sends a request to the application 204 and asks the application 204 in the request whether the requested new plug-in to be installed has already been installed. At 614, the application 204 sends a response to the request to web page 604, and informs the web page 604 whether the new plug-in has already been installed or has not yet been installed.

At 616 in method 600, if the new plug-in has not yet been installed, the application installation process starts. At 618, the web page 604 asks the user 602 for various information (e.g., permission information, terms of use or terms of conditions (TOC) information, privacy information, etc.). At 620, the user 602 provides approval for installation of the new plug-in. At 622, the web page 604 provides application 204 with instructions on what new plug-in to download, where to download the new plug-in, and a URL to callback when the installation is complete. At 624, the application 204 downloads the new plug-in, and installs the new plug-in on the computing device 200 of the user 602. At 626, the application 204 makes a URL call to the web server 606 after the installation of the new plug-in. At 628, the web server 606 updates the UI of the web page 604 to reflect the change and the updated application functionality.

A new plug-in distributed using application 204 as described above can be done with the minimal amount of UI the user needs to legally accept the plug-in installation via a web page UI, and the rest of the plug-in installation can be completely invisible to the end user 602 (i.e., a UI provided during installation can be completely at the discretion of the web application). After installation is completed, application 204 can call out to a URL specified by the invoking web application to notify that installation is complete. After that, the web solution can determine how to proceed with their user interaction. With proper notification and legal acceptance by the user as to what is going to be done on their behalf, the entire process can be simplified to a web page and the entire UI experience is then driven by the web solution.

Figure 7:
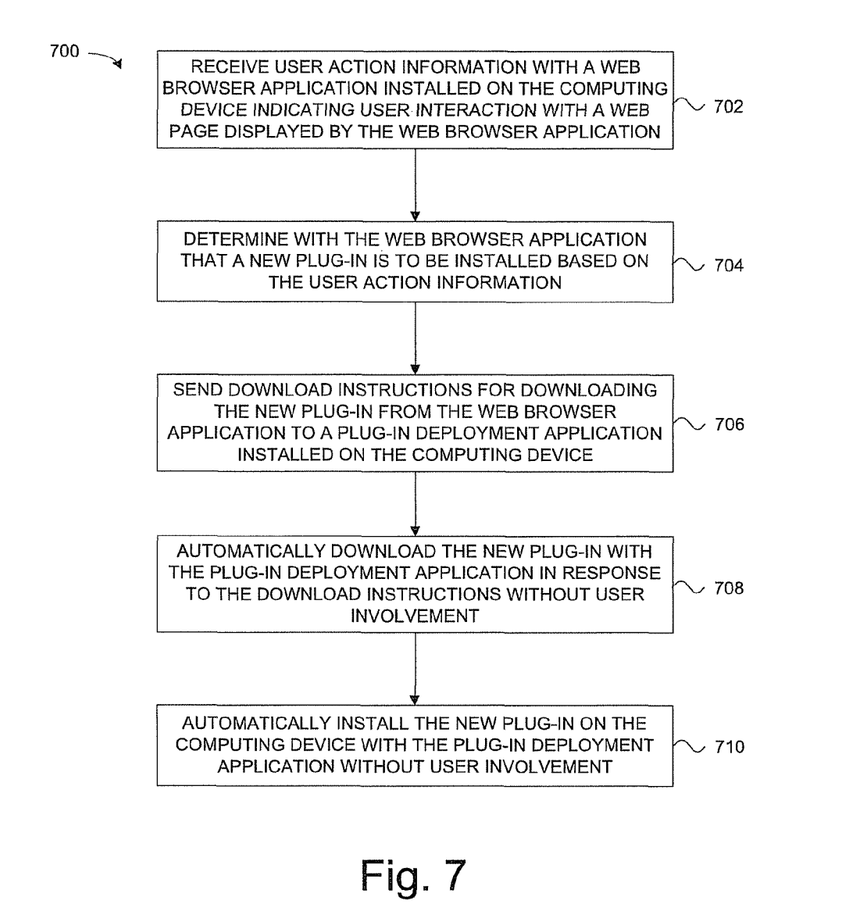
FIG. 7 is a flow diagram illustrating a computer-implemented method of installing a plug-in on a computing device according to another example.

FIG. 7 is a flow diagram illustrating a computer-implemented method 700 of installing a plug-in on a computing device according to another example. At 702 in method 700, a web browser application installed on the computing device receives user action information indicating user interaction with a web page displayed by the web browser application. At 704, the web browser application determines that a new plug-in is to be installed based on the user action information. At 706, download instructions for downloading the new plug-in are sent from the web browser application to a plug-in deployment application installed on the computing device. At 708, the plug-in deployment application automatically downloads the new plug-in in response to the download instructions without user involvement. At 710, the plug-in deployment application automatically installs the new plug-in on the computing device without user involvement.

In one embodiment, method 700 further includes sending a request from the web browser application to the plug-in deployment application that asks whether the new plug-in has already been installed an the computing device, and responding to the request with the plug-in deployment application and informing the web browser application whether the new plug-in has already been installed on the computing device.

In one embodiment of method 700, the download instructions include a location of the new plug-in. In one embodiment, the download instructions include a Uniform Resource Locator (URL) for the plug-in deployment application to call when the installation is complete. In one form of this embodiment, the method 700 further includes calling the URL with the plug-in deployment application after the installation is complete, and updating with a web server at the URL a user interface of the web page displayed by the web browser application to indicate a change in application functionality.

In one embodiment of method 700, the plug-in deployment application includes a REpresentational State Transfer (REST) Application Programming Interface (API) for communicating with the web browser application. In one form of this embodiment, the method 700 further includes sending the download instructions from the web browser application to the plug-in deployment application via the REST API using Asynchronous JavaScript and XML (AJAX) communications.

In one embodiment, the method 700 further includes: automatically downloading at least one additional plug-in with the plug-in deployment application in response to the download instructions without user involvement; and automatically installing the at least one additional plug-in on the computing device with the plug-in deployment application without user involvement, wherein the downloading and installing of the at least one additional plug-in occurs on a date subsequent to a date of the downloading and installing of the new plug-in.

Another embodiment is directed to a computing device that includes at least one processor configured to execute a web browser application and a separate and distinct plug-in deployment application. The web browser application is configured to receive user action information indicating user interaction with a web page displayed by the web browser application, determine that a new plug-in is to be installed based on the user action information, and provide the plug-in deployment application with download instructions for downloading the new plug-in. The plug-in deployment application is configured to automatically download the new plug-in in response to the download instructions without user involvement, and automatically install the new plug-in on the computing device without user involvement.

In one embodiment, the web browser application is configured to send a request to the plug-in deployment application that asks whether the new plug-in has already been installed on the computing device, and the plug-in deployment application is configured to respond to the request and inform the web browser application whether the new plug-in has already been installed on the computing device.

In one embodiment, the download instructions include a location of the new plug-in. The download instructions according to one embodiment include a Uniform Resource Locator (URL) for the plug-in deployment application to call when the installation is complete, and the plug-in deployment application is configured to call the URL after the installation is complete. In one form of this embodiment, a web server at the URL is configured to update a user interface of the web page displayed by the web browser application to indicate a change in application functionality.

In one embodiment, the plug-in deployment application includes a REpresentational State Transfer (REST) Application Programming Interface (API) for communicating with the web browser application. In one form of this embodiment, the web browser application is configured to send the download instructions to the plug-in deployment application via the REST API. In one embodiment, the web browser application is configured to communicate with the REST API of the plug-in deployment application using Asynchronous JavaScript and XML (AJAX) communications.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A computing device, comprising:
at least one processor to execute a web browser application and a separate and distinct script execution application,
wherein the web browser application is to submit a script execution request to the script execution application to request execution of a first script task at a specified future date and time, wherein the script execution request includes a link to a website, wherein the script execution application includes a Representational State Transfer (REST) Application Programming Interface (API) to receive the script execution request from the web browser application, and
wherein, at the specified future date and time, the script execution application is to execute the first script task based on the script execution request, including downloading a document from the website at the specified future date and time, discovering a printer connected to the computing device, and sending the document from the computing device to the printer for printing the document.

2. The computing device of claim 1, wherein the web browser application is to submit another script execution request to the script execution application for requesting an immediate execution of the first script task, including immediately downloading the document from the website, discovering the printer, and sending the document to the printer for printing.

3. The computing device of claim 1, wherein the script execution application is to execute the first script task at the specified future date and time regardless of whether a user of the computing device is logged in at the specified future date and time.

4. The computing device of claim 1, wherein the script execution application is to download the document from the website to the computing device, discover the printer, and send the document to the printer at the specified future date and time regardless of whether the web browser application is running at the specified future date and time.

5. The computing device of claim 1, wherein the link in the script execution request identifies a Uniform Resource Locator (URL) of the website to assist the script execution application to obtain the first script task for execution.

6. The computing device of claim 1, wherein the first script task provides the web browser application with a list of available printers.

7. The computing device of claim 1, wherein the first script task schedules recurring delivery of documents from the web site to the printer.

8. The computing device of claim 1, where the web browser application communicates with the REST API of the script execution application using Asynchronous JavaScript and XML (AJAX) communications.

9. The computing device of claim 1, wherein the first script task is a JavaScript task.

10. The computing device of claim 1, wherein execution of the first script task by the script execution application includes communications between the first script task and at least one of a web service, an operating system of the computing device, and a local file system of the computing device.

11. A computer-implemented method of executing a script task, comprising:
providing a web browser application and a separate and distinct script execution application on a computing device;
sending a script execution request from the web browser application to the script execution application to request execution of a first script task at a specified future date and time, wherein the script execution request includes a link to a website; and
at the specified future date and time, retrieving and executing the first script task with the script execution application based on the script execution request, including:
downloading a document from the website at the specified future date and time,
discovering a printer connected to the computing device, and
sending the document from the computing device to the printer for printing the document.

12. The method of claim 11, further comprising:
sending another script execution request from the web browser application to the script execution application for requesting an immediate execution of the first script task, including immediately downloading the document from the website, discovering the printer, and sending the document to the printer for printing.

13. The method of claim 11, wherein executing the first script task includes executing the first script task at the specified future date and time regardless of whether a user of the computing device is logged in at the specified future date and time.

14. The method of claim 11, wherein executing the first script task includes downloading the document from the website at the specified future date and time, discovering the printer, and sending the document to the printer regardless of whether the web browser application is running at the specified future date and time.

15. A non-transitory computer readable medium in a computing device storing a web browser application and a script execution application separate and distinct from the web browser application, wherein when executed by at least one processor, the script execution application is to:
receive script execution requests from the web browser application, wherein the script execution requests include requests for immediate execution of scripts and requests for scheduled execution of scripts at future points in time, wherein the script execution application includes a Representational State Transfer (REST) Application Programming Interface (API) to receive the script execution requests from the web browser application, and wherein one of the requests for scheduled execution of scripts is a request to execute a script at a specific future time and includes a link to a website, and at the specific future time, retrieve and execute the script based on the request, including downloading a document from the website to the computing device at the specific future time, discovering a printer connected to the computing device, and sending the document from the computing device to the printer for printing the document.

16. The non-transitory computer readable medium of claim 15, wherein the script execution application is to download the document from the website at the specific future time, discover the printer, and send the document to the printer regardless of whether the web browser application is running at the specific future time.

17. The non-transitory computer readable medium of claim 15, wherein the link of the website in the script execution request is a Uniform Resource Locator (URL) of the website.

* * * * *

UNITED STATES PATENT AND TRADEMARK OFFICE
CERTIFICATE OF CORRECTION

| | | |
|---|---|---|
| PATENT NO. | : 9,946,557 B2 | Page 1 of 1 |
| APPLICATION NO. | : 14/397585 | |
| DATED | : April 17, 2018 | |
| INVENTOR(S) | : Joseph Harold Teibel et al. | |

It is certified that error appears in the above-identified patent and that said Letters Patent is hereby corrected as shown below:

On the Title Page

In item (86), PCT No.:, in Column 1, Line 1, delete "PCT/US2012/049077" and insert -- PCT/US2012/049078 --, therefor.

In the Drawings

In Fig. 3, sheet 3 of 7, reference numeral 312, Line 1, delete "Scrpt" and insert -- Script --, therefor.

In the Claims

In Column 10, Line 3, in Claim 7, delete "web site" and insert -- website --, therefor.

Signed and Sealed this
Twenty-sixth Day of November, 2019

Andrei Iancu
*Director of the United States Patent and Trademark Office*